(No Model.)
R. G. CULBERTSON.
HARROW TOOTH.
No. 416,400. Patented Dec. 3, 1889.
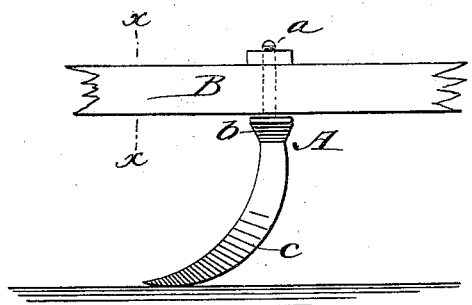
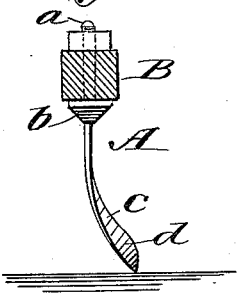
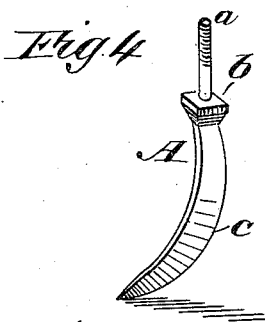
WITNESSES:
Francis McArdle.
C. Sedgwick
INVENTOR:
R. G. Culbertson
BY Munn & Co.
ATTORNEYS.

UNITED STATES PATENT OFFICE.

ROBERT G. CULBERTSON, OF NEAR HALE, MISSOURI.

HARROW-TOOTH.

SPECIFICATION forming part of Letters Patent No. 416,400, dated December 3, 1889.

Application filed February 8, 1889. Serial No. 299,128. (No model.)

*To all whom it may concern:*

Be it known that I, ROBERT G. CULBERTSON, residing near Hale, in the county of Carroll and State of Missouri, have invented a new and Improved Harrow-Tooth, of which the following is a full, clear, and exact description.

My invention consists of a harrow-tooth having a backwardly-curved cutting-edge and an upright shank, the blade or body of the tooth being laterally curved from the line of the shank. This gives the tooth a slight twist or spiral form, so that in use the point has a diagonal cutting or penetrating action, and at the same time a lifting action, which is very effective in disintegrating the ground. By adjusting the tooth axially the lateral cutting action may be increased or diminished, or wholly prevented, in which latter case the tooth acts to smooth the ground. The plane of the lower end or point of the tooth stands at an angle to the shank, and the lowermost edge is curved, so that the tooth will easily ride over obstructions which it cannot penetrate.

Reference is to be had to the accompanying drawings, forming a part of this specification, in which similar letters of reference indicate corresponding parts in all the figures.

Figure 1 is a side elevation of a harrow-tooth made in accordance with my invention, the same being shown attached to a harrow bar or beam. Fig. 2 is a sectional view on line *x x* of Fig. 1. Fig. 3 is a plan view of the tooth in position to penetrate and lift the soil. Fig. 4 is a perspective view of the tooth, and Fig. 5 is a plan view showing the tooth turned to position for smoothing the ground.

The tooth A is formed with a shank *a* to pass through the beam B. At the bottom of the shank is formed the limit-shoulder *b*. Below the shoulder *b* the tooth is made in the form of a blade that is thin and of considerable width, and it is curved back and also to one side, and the edge *c* is sharp to cut the sod. By this double curve the tooth is made slightly spiral, and the lowermost part *d* stands at an angle to the shank *a*, as shown clearly in Figs. 3 and 5.

By turning the tooth, as shown in Fig. 3, it makes a deep side cut in the ground and has a plow action in lifting the soil by the angle at *d*. This action will be diminished by turning the point of the tooth back, and by properly adjusting the tooth this cutting and lifting action may be increased or diminished, as desired.

By turning the tooth to the position shown in Fig. 5 the cutting and lifting action is entirely annihilated, and the tooth, by the inclined part *d*, will act to smooth the ground.

When the tooth is cutting, the curve *c* enables the tooth to easily pass obstructions it cannot penetrate, and when turned to smoothing position the incline *d* enables the tooth to pass over any solid obstruction.

Having thus described my invention, what I claim as new, and desire to secure by Letters Patent, is—

The harrow-tooth herein shown and described, the same consisting of a main blade having a backward sweep or curve, a curved cutting-edge turned to one side at the lower end or point of the tooth, and an upright shank at the upper end to enter the beam and to adapt the tooth to be axially adjusted to reduce or increase its penetration and also to adapt it to act as a smoothing-point, substantially as described.

ROBERT G. CULBERTSON.

Witnesses:
   W. L. STEWART,
   W. T. DIXON.